United States Patent
Tokura

(10) Patent No.: US 8,196,535 B2
(45) Date of Patent: *Jun. 12, 2012

(54) SEWING MACHINE, AND COMPUTER-READABLE STORAGE MEDIUM STORING SEWING MACHINE CONTROL PROGRAM

(75) Inventor: Masashi Tokura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 662 days.

This patent is subject to a terminal disclaimer.

(21) Appl. No.: 12/320,339

(22) Filed: Jan. 23, 2009

(65) Prior Publication Data

US 2009/0188414 A1    Jul. 30, 2009

(30) Foreign Application Priority Data

Jan. 24, 2008 (JP) .................................. 2008-013414

(51) Int. Cl.
D05B 19/00 (2006.01)

(52) U.S. Cl. .................................. 112/470.01; 700/136

(58) Field of Classification Search .......... 700/136–138; 112/470.01, 470.06, 475.19, 470.04
See application file for complete search history.

(56) References Cited

U.S. PATENT DOCUMENTS

| | | | |
|---|---|---|---|
| 6,263,815 B1 * | 7/2001 | Furudate | 112/470.13 |
| 6,871,606 B2 * | 3/2005 | Schweizer | 112/102.5 |
| 6,994,042 B2 * | 2/2006 | Schweizer | 112/470.03 |
| 7,155,302 B2 * | 12/2006 | Muto et al. | 700/138 |

FOREIGN PATENT DOCUMENTS

| | | |
|---|---|---|
| JP | A-61-277012 | 12/1986 |
| JP | A-63-61903 | 3/1988 |
| JP | A-64-2889 | 1/1989 |
| JP | A-4-181106 | 6/1992 |
| JP | A-4-364884 | 12/1992 |
| JP | A-4-364885 | 12/1992 |
| JP | A-7-265569 | 10/1995 |
| JP | A-8-71287 | 3/1996 |
| JP | B2-3138080 | 2/2001 |
| JP | 2001-116656 | 4/2001 |
| JP | B2-3550185 | 8/2004 |
| JP | B2-3753445 | 3/2006 |

OTHER PUBLICATIONS

Mar. 13, 2012 Office Action issued in Japanese Patent Application No. 2008-013414 (with English Translation).

* cited by examiner

*Primary Examiner* — Nathan Durham
(74) *Attorney, Agent, or Firm* — Oliff & Berridge, PLC

(57) ABSTRACT

A sewing machine includes an image pickup device that picks up over a sewing machine bed; a feature point coordinates calculation device that extracts feature points from the picked up image and calculates two-dimensional coordinates of the extracted feature points; a reference coordinates storage device that stores reference coordinates, which are previously measured three-dimensional coordinates of the feature points; a correlation device that correlates the reference coordinates stored in the reference coordinates storage device with the feature point coordinates, which are the two-dimensional coordinates of the feature points calculated by the feature point coordinates calculation device; and a parameter calculation device that calculates a parameter about the image pickup device based on a result of correlation by the correlation device.

14 Claims, 15 Drawing Sheets

| TWO-DIMENSIONAL FEATURE POINT COORDINATES STORAGE AREA | | |
|---|---|---|
| FEATURE POINT NO. | TWO-DIMENSIONAL IMAGE COORDINATES | |
| | x | y |
| 0 | 317 | 229 |
| 1 | 294 | 229 |
| 2 | 283 | 229 |
| 3 | 260 | 229 |
| 4 | 248 | 228 |
| 5 | 225 | 228 |
| 6 | 213 | 228 |
| 7 | 192 | 227 |
| 8 | 280 | 343 |
| 9 | 255 | 343 |
| 10 | 243 | 343 |
| 11 | 220 | 343 |
| 12 | 279 | 373 |
| 13 | 254 | 373 |
| 14 | 242 | 373 |
| 15 | 218 | 373 |
| 16 | 312 | 436 |
| 17 | 289 | 436 |
| 18 | 276 | 436 |
| 19 | 252 | 436 |
| 20 | 238 | 436 |
| 21 | 214 | 435 |
| 22 | 201 | 435 |
| 23 | 177 | 435 |
| 24 | 71 | 122 |
| 25 | 37 | 453 |
| 26 | 601 | 130 |
| 27 | 624 | 453 |

FIG. 6

| EEPROM | |
|---|---|
| THREE DIMENSIONAL FEATURE POINT COORDINATES STORAGE AREA | ~641 |
| INTERNAL PARAMETER STORAGE AREA | ~642 |
|     X-AXIAL FOCAL DISTANCE STORAGE AREA | ~6421 |
|     Y-AXIAL FOCAL DISTANCE STORAGE AREA | ~6422 |
|     X-AXIAL PRINCIPAL POINT COORDINATES STORAGE AREA | ~6423 |
|     Y-AXIAL PRINCIPAL POINT COORDINATES STORAGE AREA | ~6424 |
|     FIRST COEFFICIENT OF STRAIN STORAGE AREA | ~6425 |
|     SECOND COEFFICIENT OF STRAIN STORAGE AREA | ~6426 |
| EXTERNAL COMPARISON PARAMETER STORAGE AREA | ~643 |
|     X-AXIAL ROTATION VECTOR STORAGE AREA | ~6431 |
|     Y-AXIAL ROTATION VECTOR STORAGE AREA | ~6432 |
|     Z-AXIAL ROTATION VECTOR STORAGE AREA | ~6433 |
|     X-AXIAL TRANSLATIONAL VECTOR STORAGE AREA | ~6434 |
|     Y-AXIAL TRANSLATIONAL VECTOR STORAGE AREA | ~6435 |
|     Z-AXIAL TRANSLATIONAL VECTOR STORAGE AREA | ~6436 |

| THREE-DIMENSIONAL FEATURE POINT COORDINATES STORAGE AREA | | | |
|---|---|---|---|
| FEATURE POINT NO. | THREE-DIMENSIONAL IMAGE COORDINATES (IN WORLD COORDINATE SYSTEM) | | |
| | X | Y | Z |
| 0 | 0 | 0 | 0 |
| 1 | -3.1 | 0 | 0 |
| 2 | -4.7 | 0 | 0 |
| 3 | -8 | 0 | 0 |
| 4 | -9.5 | 0 | 0 |
| 5 | -12.8 | 0 | 0 |
| 6 | -14.4 | 0 | 0 |
| 7 | -17.5 | 0 | 0 |
| 8 | -4.7 | -16 | 0 |
| 9 | -8 | -16 | 0 |
| 10 | -9.5 | -16 | 0 |
| 11 | -12.8 | -16 | 0 |
| 12 | -4.7 | -20 | 0 |
| 13 | -8 | -20 | 0 |
| 14 | -9.5 | -20 | 0 |
| 15 | -12.8 | -20 | 0 |
| 16 | 0 | -28 | 0 |
| 17 | -3.1 | -28 | 0 |
| 18 | -4.7 | -28 | 0 |
| 19 | -8 | -28 | 0 |
| 20 | -9.5 | -28 | 0 |
| 21 | -12.8 | -28 | 0 |
| 22 | -14.4 | -28 | 0 |
| 23 | -17.5 | -28 | 0 |
| 24 | -35.75 | 15.9 | 0 |
| 25 | -35.75 | -30.7 | 0 |
| 26 | 41.25 | 15.9 | 0 |
| 27 | 41.25 | -29.6 | 0 |

| THREE-DIMENSIONAL FEATURE POINT COORDINATES STORAGE AREA ||||||
|---|---|---|---|---|---|
| EMBROIDERY FRAME POSITION NO. | EMBROIDERY FRAME POSITION || THREE-DIMENSIONAL COORDINATES (IN WORLD COORDINATE SYSTEM) |||
| | X | Y | X | Y | Z |
| 1 | 0 | 0 | 0 | 0 | 0 |
| 2 | −5 | 0 | −5 | 0 | 0 |
| 3 | 0 | −5 | 0 | −5 | 0 |
| ⋮ | ⋮ | ⋮ | ⋮ | ⋮ | ⋮ |

SEWING MACHINE, AND COMPUTER-READABLE STORAGE MEDIUM STORING SEWING MACHINE CONTROL PROGRAM

CROSS-REFERENCE TO RELATED APPLICATION

This application claims priority from JP 2008-013414, filed on Jan. 24, 2008, the content of which is hereby incorporated herein by reference in its entirety.

BACKGROUND

The present disclosure relates to a sewing machine and a computer-readable storage medium storing a program that controls the sewing machine and, more particularly, to a sewing machine equipped with an image pickup device and a computer-readable storage medium storing a control program that controls the sewing machine.

Conventionally, for a variety of purposes, a sewing machine has been proposed which is equipped with an image pickup device. For example, in an embroidery data modification apparatus described in Japanese Patent Application Laid-Open Publication No. HEI 4-364884, an electronic camera is equipped on a sewing machine that performs sewing based on embroidery data. An image photographed with the electronic camera is utilized to modify the location of a needle drop point for a stitch in accordance with actual sewing results. Generally, in the case of acquiring and utilizing the location (coordinates) of a photography subject by an image photographed with a camera as in the case of measurement by use of an air photo, the camera will be calibrated in order to grasp a precise location of the photography subject based on the image. Camera calibration involves the calculation of an internal parameter which is determined by a configuration of the camera such as a focal distance or a principal point coordinate and an external parameter which is determined by a condition in which the camera is set up such as its photographing direction. With the parameters calculated through camera calibration, it is possible to know a location in a two-dimensional coordinate system (photographed image) at which a point (real photography subject) in a three-dimensional coordinate system should be projected. Therefore, if a point in the photographed image is projected precisely with the parameters, a precise location (coordinates) of that point becomes clear. Thus, by carrying out camera calibration, it is possible to correct strain in picked-up images which is caused by properties of the camera itself or a condition in which the camera is set up. How to perform camera calibration (calculate the parameters) has been studied variously, resulting in the proposal of, for example, an automatic calibration apparatus for a visual sensor described in Japanese Patent Application Laid-Open Publication No. 3138080.

SUMMARY

If an image picked up with an electronic camera is used as it is as in the case of an embroidery data modification apparatus described in Japanese Patent Application Laid-Open Publication No. HEI 4-364884, there is such a problem that a shift could highly occur in coordinates acquired from the image. Particularly, in the case of modifying or processing sewing data by an image picked up with the electronic camera, the picked-up image may not precisely be corrected due to that problem, thus bringing about a problem that the results of sewing may not be beautiful.

To solve these problems, the present disclosure has been developed, and it is an object of the present disclosure to provide a sewing machine that is equipped with an image pickup device and that can acquire correct position information from an image picked up by the image pickup device, and a computer-readable storage medium storing a control program that controls this sewing machine.

To solve those problems, the first aspect of the present disclosure provides a sewing machine comprising an image pickup device that is disposed at a position where an image can be picked up over a sewing machine bed; a feature point coordinates calculation device that extracts a plurality of feature points arranged in over a range such that the image pickup device can pick up images therein from the image picked up by the image pickup device and calculates two-dimensional coordinates of the extracted feature points; a reference coordinates storage device that stores reference coordinates, which are previously measured three-dimensional coordinates of the feature points; a correlation device that correlates the reference coordinates stored in the reference coordinates storage device with the feature point coordinates, which are the two-dimensional coordinates of the feature points calculated by the feature point coordinates calculation device; and a parameter calculation device that calculates a parameter about the image pickup device based on a result of correlation by the correlation device.

The second aspect of the present disclosure provides a computer-readable storage medium storing a control program executable on a sewing machine, the program comprising an image pickup step of picking up an image over a predetermined range over a sewing machine bed; a feature point coordinates calculation step of extracting a plurality of feature points arranged in the predetermined range from the image picked up at the image pickup step and calculating two-dimensional coordinates of the extracted feature points; a reference coordinates storage step of storing reference coordinates, which are previously measured three-dimensional coordinates of the feature points; a correlation step of correlating the reference coordinates stored at the reference coordinates storage step with the feature point coordinates, which are the two-dimensional coordinates of the feature points calculated at the feature point coordinates calculation step; and a parameter calculation step of calculating a parameter about the image pickup step based on a result of correlation at the correlation step.

BRIEF DESCRIPTION OF THE DRAWINGS

Exemplary embodiments of the invention will be described below in detail with reference to the accompanying drawings in which:

FIG. 5 is a table of a configuration of two-dimensional feature point coordinates storage areas arranged in the RAM;

FIG. 6 is a diagram of a configuration of storage areas arranged in an EEPROM;

FIG. 7 is a table of a configuration of three-dimensional feature point coordinates storage areas arranged in the EEPROM;

FIG. 15 is a table of a configuration of three-dimensional feature point coordinates storage areas in accordance with a modification.

DETAILED DESCRIPTION

Figure 1:
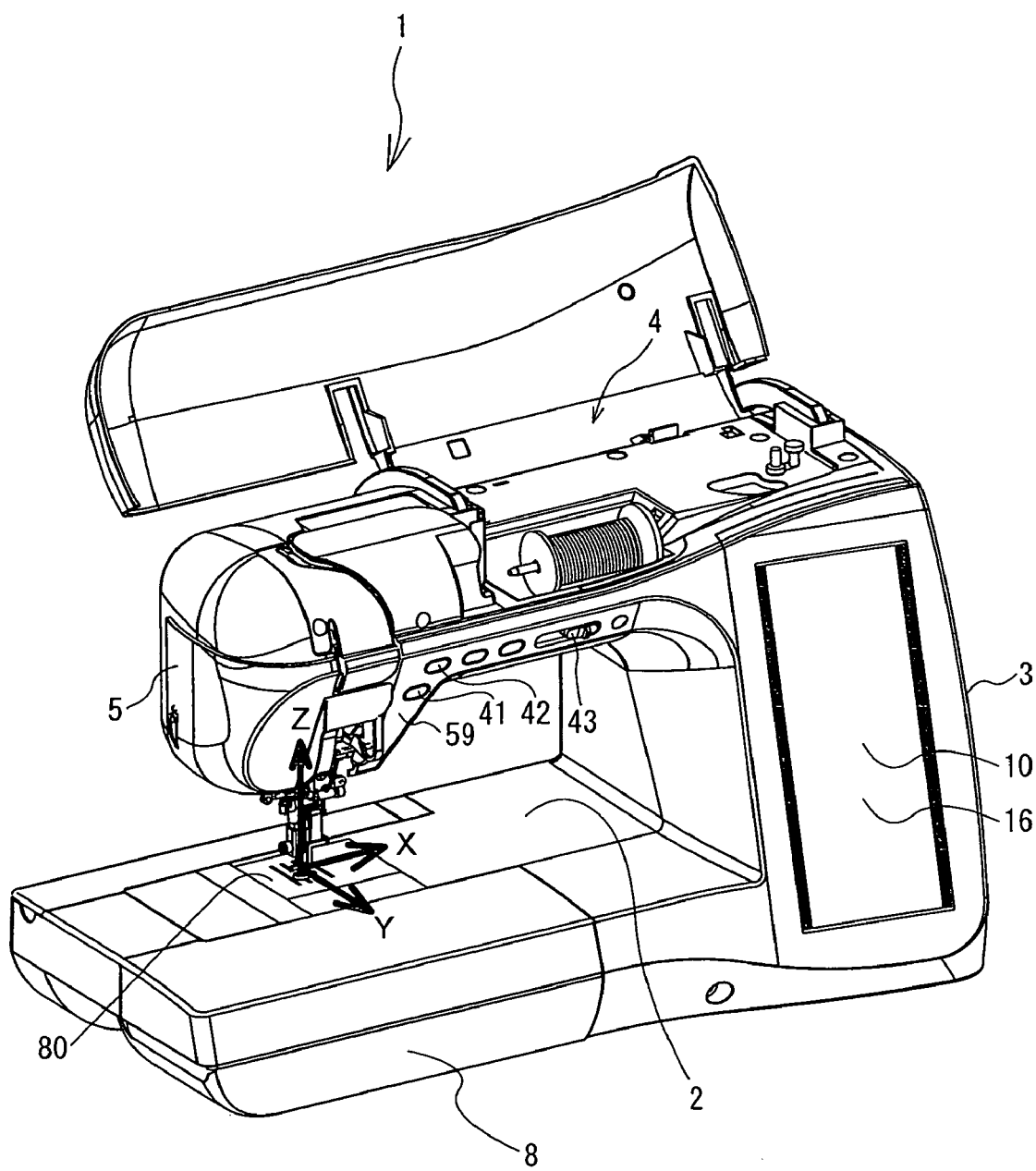
FIG. 1 is a perspective view of a sewing machine as viewed from above.

The following will describe embodiments of the present disclosure with reference to the drawings. The physical and electrical configurations of a sewing machine 1 will be described below with reference to FIGS. 1 to 3. First, the physical configuration of the sewing machine 1 will be described with reference to FIG. 1. As shown in FIG. 1, the sewing machine 1 includes a sewing machine bed 2, a pillar 3, an arm 4, and a head 5. The sewing machine bed 2 extends long in the right and left direction. The pillar 3 is erected upward at the right end portion of the sewing machine bed 2. The arm 4 extends leftwards at the upper end of the pillar 3. The head 5 is provided at the left end portion of the arm 4. The pillar 3 has on its front surface portion a liquid crystal display (LCD) 10 equipped with a touch panel 16 on its surface. The LCD 10 displays input keys for inputting a sewing pattern, sewing conditions, etc. By touching positions corresponding to these input keys on the touch panel 16, the user can select a sewing pattern, sewing conditions, etc. The sewing machine 1 contains a sewing machine motor 79 (see FIG. 3), a drive shaft (not shown), a needle bar 6 (see FIG. 2), a needle bar up-and-down movement mechanism (not shown), a needle bar swinging mechanism (not shown), etc. At the lower end portion of the needle bar 6, a sewing needle 7 is mounted. The needle bar up-and-down movement mechanism is used to move the needle bar 6 up and down. The needle bar swinging mechanism is used to swing the needle bar 6 in the right-and-left direction. In FIG. 1, the direction of an arrow X is referred to as the right direction and its opposite direction is referred to as the left direction; and the direction of an arrow Y is referred to as the front direction and its opposite direction is referred to as the rear direction.

On the top portion of the sewing machine bed 2, a needle plate 80 (see FIG. 8) is disposed. The sewing machine bed 2 contains a feed dog back-and-forth movement mechanism (not shown), a feed dog up-and-down movement mechanism (not shown), a feed adjustment pulse motor 78 (see FIG. 3), a shuttle (not shown), etc. The feed dog back-and-forth movement mechanism and the feed dog up-and-down movement mechanism drive a feed dog. The feed adjustment pulse motor 78 adjusts a distance by which work cloth is fed by the feed dog. The shuttle houses a bobbin around which a bobbin thread is wound. At the left end of the sewing machine bed 2, a side table 8 is fitted. The side table 8 is detachable. If the side table 8 is detached, an embroidery apparatus 30 can be attached to the sewing machine bed 2 instead (see FIG. 11).

On the right side surface of the sewing machine 1, a pulley (not shown) is mounted which is used to rotate the drive shaft by hand so that the needle bar 6 may be moved up and down. On the front surface of the head 5 and the arm 4, a front surface cover 59 is mounted. On the front cover 59 are mounted a sewing start-and-stop switch 41, a reverse switch 42, and other operation switches. The sewing start-and-stop switch 41 is used to instruct the sewing machine 1 to start and stop its operations, that is, to start and stop sewing. The reverse switch 42 is used to feed work cloth in the reverse direction, that is, from the rear side to the front side. The front surface cover 59 is mounted thereon with a speed adjustment knob 43 with which to adjust a rotation speed of the drive shaft. Under the front surface cover 59, at the diagonally upward right position of the sewing needle 7, an image sensor 50 (see FIG. 2) is mounted. The image sensor 50 can pick up an image of the entirety of the needle plate 80. If the sewing start-and-stop switch 41 is pressed when the sewing machine 1 is paused, it starts operations; and if that switch is pressed when the sewing machine 1 is operating, it stops operations.

Figure 2:
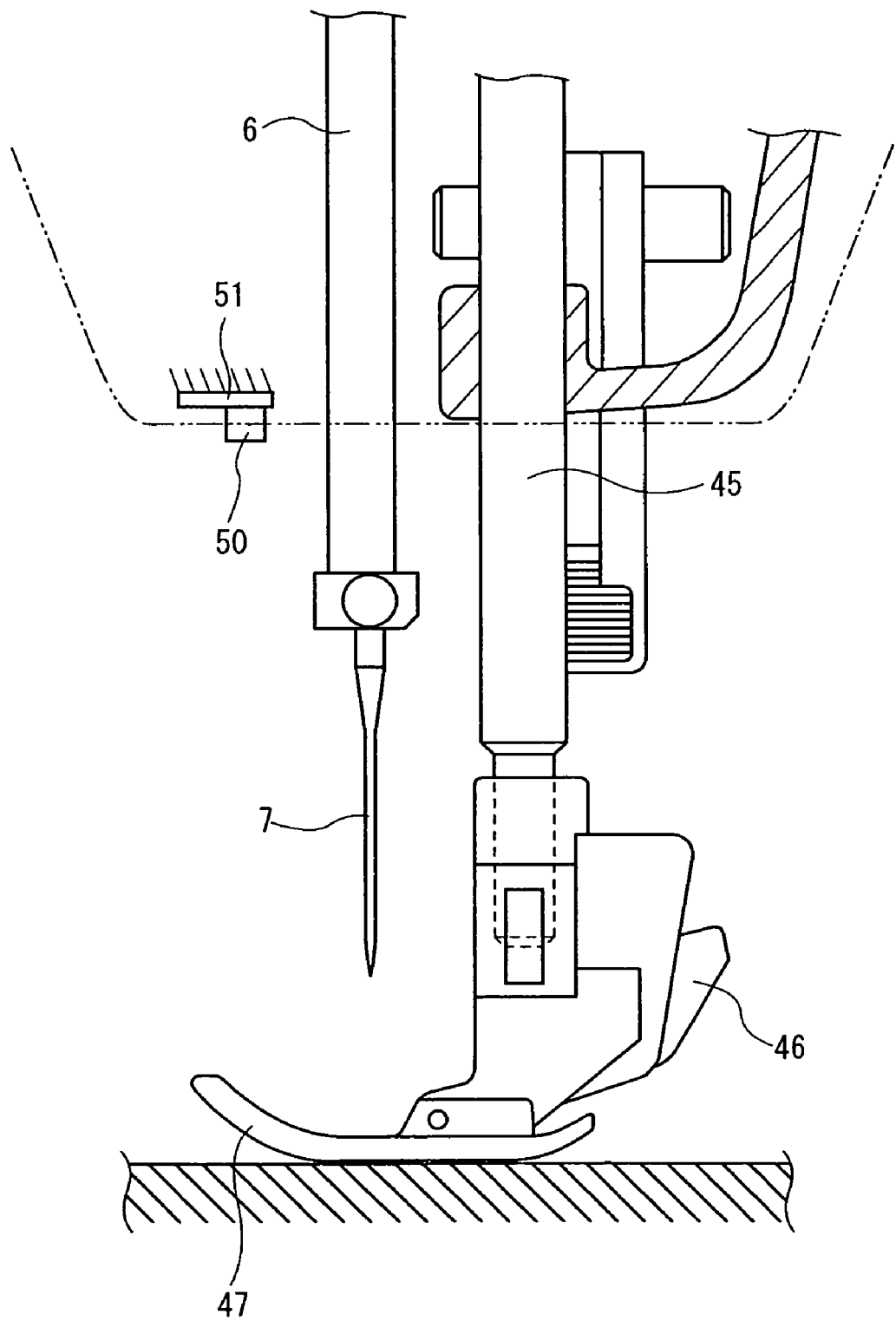
FIG. 2 is a schematic view of an image sensor.

Next, the image sensor 50 will be described below with reference to FIG. 2. The image sensor 50 is a known CMOS image sensor and picks up an image. In the present embodiment, as shown in FIG. 2, a support frame 51 is attached to a frame, not shown, of the sewing machine 1. To the support frame 51, the image sensor 50 is mounted in such a manner that it can pick up an image of the needle plate 80 as a whole. Hereinafter, an image picked up by the image sensor 50 is referred to as a "picked up image". Also, a point on work cloth at which the sewing needle 7 is stuck into it as being moved downward by the needle bar up-and-down movement mechanism is referred to as a "needle drop point". At the lower end portion of a presser bar 45, a presser holder 46 is fixed. The presser holder 46 is mounted with a presser foot 47, which holds down work cloth. It should be noted that the image sensor 50 may be a CCD camera or any other image pickup device instead of a CMOS image sensor.

Figure 3:
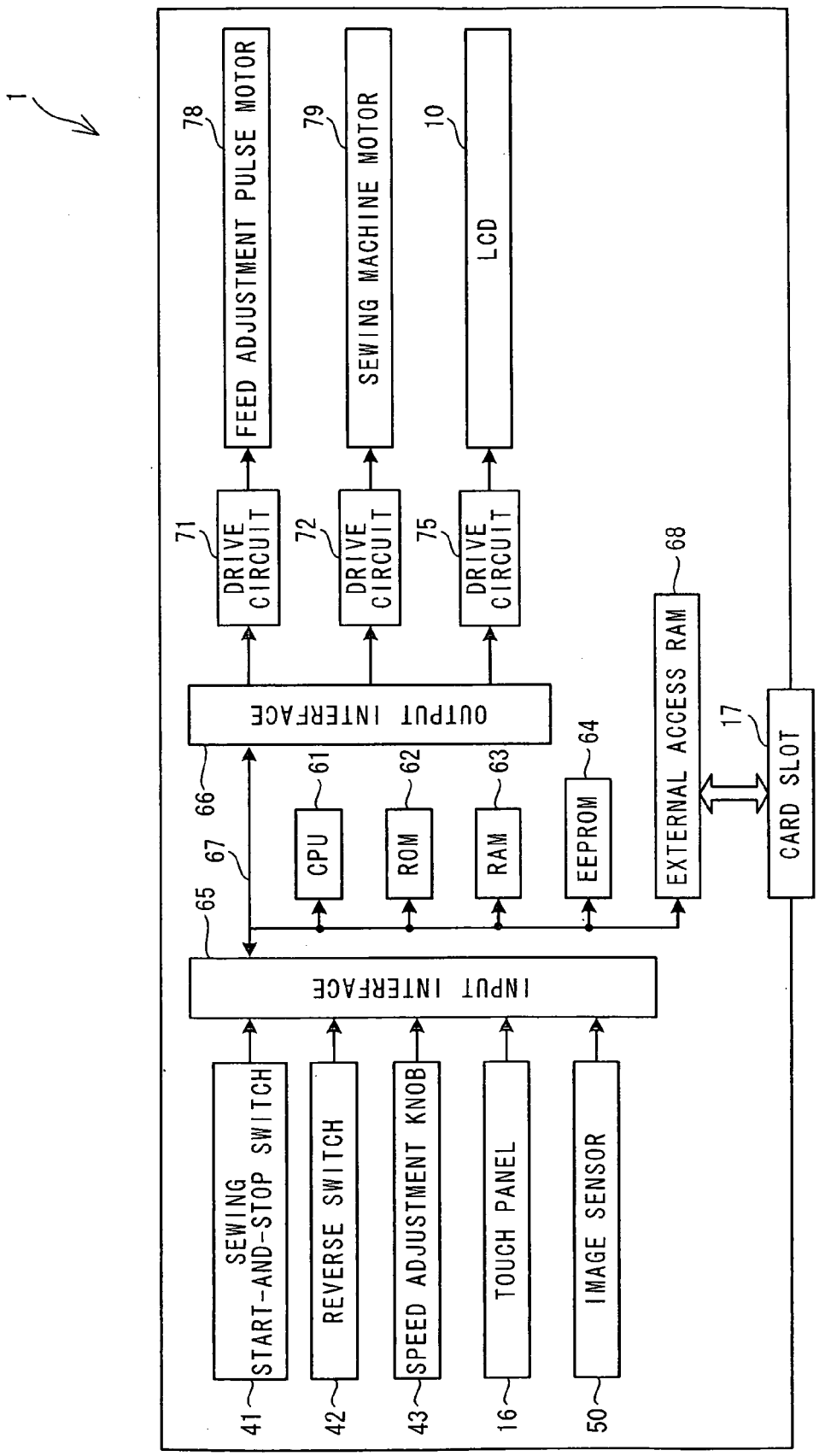
FIG. 3 is a block diagram of an electrical configuration of the sewing machine.

Next, the electrical configuration of the sewing machine 1 will be described below with reference to FIG. 3. As shown in FIG. 3, the sewing machine 1 comprises a CPU 61, a ROM 62, a RAM 63, an EEPROM 64, a card slot 17, an external access RAM 68, an input interface 65, an output interface 66, etc., which are connected to each other with a bus 67. To the input interface 65 are connected the sewing start-and-stop switch 41, the reverse switch 42, the speed adjustment knob 43, the touch panel 16, the image sensor 50, etc. To the output interface 66 are connected drive circuits 71, 72, and 75 electrically. The drive circuit 71 is used to drive the feed adjustment pulse motor 78. The drive circuit 72 is used to drive the sewing machine motor 79, which rotary-drives the drive shaft. The drive circuit 75 is used to drive the LCD 10.

The CPU 61 conducts main control over the sewing machine 1 and executes various kinds of operations and processing in accordance with a control program stored in a control program storage region in the ROM 62. The RAM 63, which is a random access memory, includes a variety of storage regions as required in which to store results of operations performed by the CPU 61.

Figure 4:
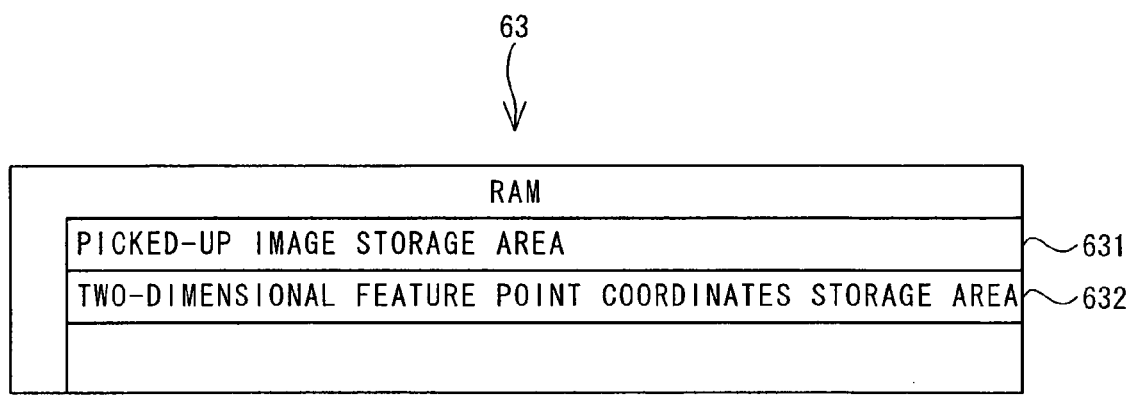
FIG. 4 is a diagram of a configuration of storage areas arranged in an RAM.

Next, the storage areas arranged in the RAM 63 and the EEPROM 64 will be described below with reference to FIGS. 4 to 7. First, the storage areas arranged in the RAM 63 will be described below with reference to FIG. 4. As shown in FIG. 4, the RAM 63 includes a picked-up image storage area 631, a two-dimensional feature point coordinates storage area 632. The picked-up image storage area 631 stores an image picked up by the image sensor 50. The two-dimensional feature point coordinates storage area 632 stores the two-dimensional coordinates of a feature point extracted from the image picked up by the image sensor 50. Although not shown, other storage areas than those are arranged in the RAM 63.

The two-dimensional feature point coordinates storage area 632 arranged in the RAM 63 will be described below with reference to FIG. 5. As shown in FIG. 5, the two-dimensional feature point coordinates storage area 632 stores two-dimensional coordinates (X-coordinate, Y-coordinate) corresponding to each of feature point numbers. In the present embodiment, 28 feature points of feature point numbers "0" through "27" will be used. It should be noted that a feature point refers to a point set to the corner of a hole or the extreme point of a punch mark formed in the needle plate 80. More details will be described later with reference to FIGS. 8 and 9.

Next, the storage areas arranged in the EEPROM 64 will be described below with reference to FIG. 6. The EEPROM 64 includes a three-dimensional feature point coordinates storage area 641, an internal parameter storage area 642, and an external parameter storage area 643. The three-dimensional feature point coordinates storage area 641 stores the three-dimensional coordinates of a feature point in the world coordinate system which are calculated beforehand. The world coordinate system refers to a three-dimensional coordinate system which is used mainly in the field of three-dimensional graphics and which represents the entirety of a space so as not to be influenced by the gravity etc. of an object. Accordingly, the world coordinate system is utilized to indicate the location of an object or compare coordinates of different objects in the space. In the present embodiment, as shown in FIG. 1, the top surface of the sewing machine bed 2 is defined as an XY plane and a point having feature point No. "0" (feature point 100 shown in FIG. 9) is defined as an origin (0, 0, 0), thereby establishing a world coordinate system. The up-and-down direction, the right-and-left direction, and the front-and-rear direction of the sewing machine 1 are defined as a Z-axis, an X-axis, and a Y-axis, respectively.

The internal parameter storage area 642 and the external parameter storage area 643 store the internal parameters and the external parameters which are calculated from a picked-up image and three-dimensional coordinates of feature points, respectively. The internal parameter storage area 642 includes an X-axial focal distance storage area 6421, a Y-axial focal distance storage area 6422, an X-axial principal point coordinates storage area 6423, a Y-axial principal point coordinates storage area 6424, a first coefficient of strain storage area 6425, and a second coefficient of strain storage area 6426. The external parameter storage area 643 includes an X-axial rotation vector storage area 6431, a Y-axial rotation vector storage area 6432, and a Z-axial rotation vector storage area 6433, an X-axial translational vector storage area 6434, a Y-axial translational vector storage area 6435, and a Z-axial translational vector storage area 6436. Those parameters are used to process an image picked up by the image sensor 50 as well as to convert three-dimensional coordinates into two-dimensional coordinates and vice versa.

Next, the three-dimensional feature point coordinates storage area 641 arranged in the EEPROM 64 will be described below with reference to FIG. 7. As shown in FIG. 7, the three-dimensional feature point coordinates storage area 641 stores three-dimensional coordinates (X-coordinate, Y-coordinate, Z-coordinate) in the world coordinate system corresponding to each of feature point numbers.

Figure 8:
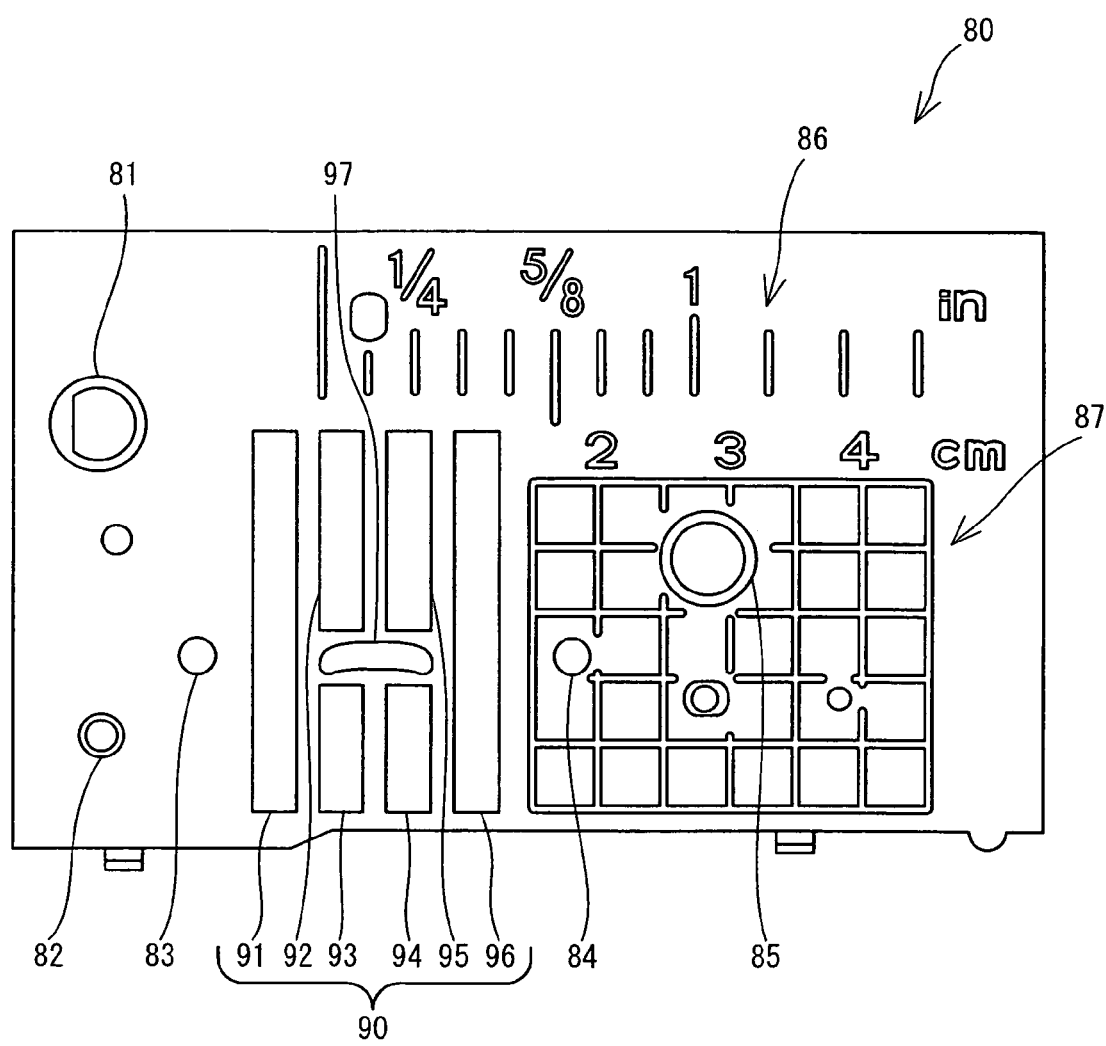
FIG. 8 is a plan view of a needle plate.
Figure 9:
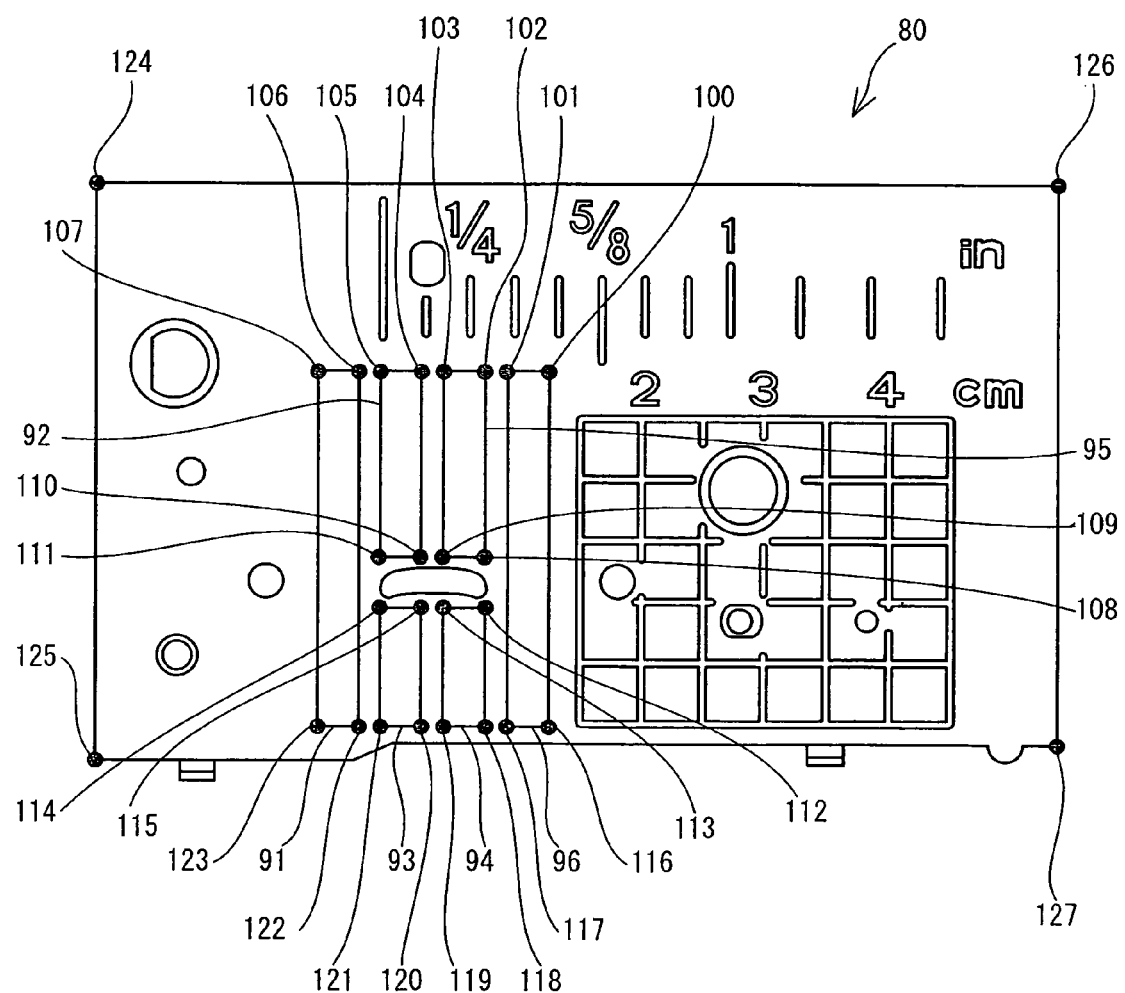
FIG. 9 is a schematic view of feature points on the plan view of the needle plate.

Next, feature points which are set on the needle plate 80 will be described below with reference to FIGS. 8 and 9. As shown in FIG. 8, the needle plate 80 has a roughly rectangular shape. As shown in FIG. 1, the needle plate 80 is fitted into the top surface of the sewing machine bed 2 directly below the presser foot 47 and the sewing needle 7. As shown in FIG. 8, the needle plate 80 has a feed dog hole 90 formed in it. The feed dog hole 90 is formed so that a feed dog (not shown) mounted in the sewing machine bed 2 may appear out of, and disappear from the sewing machine bed 2. In sewing, the feed dog appears out of the feed dog hole 90 and moves the back-and-forth and up-and-down directions, thereby feeding work cloth in its sewing direction. It should be noted that in the up-and-down direction in FIG. 8, the feed dog moves and the work cloth is sewn. The feed dog hole 90 comprises roughly rectangular feed dog holes 91 to 96 in a condition where the feed dog moving direction is defined as the longitudinal direction. At a position surrounded by the feed dogs 91 to 96, a needle hole 97 is formed through which the sewing needle 7 can be inserted. Besides the feed dog 90, holes 81 to 85 are formed at various positions. The holes 81 to 85 are formed for countersunk screws which are used to attach to the needle plate 80 sewing assisting attachments (not shown) such as a needle plate cover which covers the feed dog holes 91 to 96, a guide ruler which guides the cloth end of work cloth, a side cutter which sews the work cloth as cutting it off, and a circular sewing apparatus which sews a circular pattern, and which are also used to fix the needle plate 80 to the sewing machine bed 2. On the needle plate 80, a base line 87 and a scale mark 86 are formed which are used as a standard on which to measure a distance from the end of work cloth to a needle drop point and a standard with which to feed the work cloth linearly.

Next, the locations of feature points in the present embodiment will be described below. In FIG. 9, the feature points are indicated by a black dot. As shown in FIG. 9, feature points 100 to 127 are disposed to the vertexes (four corners) of each of the feed dog holes 91 to 96 and the vertexes (four corners) of the needle plate 80, respectively. The feature points 107, 106, 123, and 122 are disposed to the upper left, upper right, lower left, and lower right vertexes of the feed dog hole 91 in this order. The feature points 105, 104, 111, and 110 are disposed to the upper left, upper right, lower left, and lower right vertexes of the feed dog hole 92 in this order. The feature points 114, 115, 121, and 120 are disposed to the upper left, upper right, lower left, and lower right vertexes of the feed dog hole 93 in this order. The feature points 113, 112, 119, and 118 are disposed to the upper left, upper right, lower left, and lower right vertexes of the feed dog hole 94 in this order. The feature points 103, 102, 109, and 108 are disposed to the upper left, upper right, lower left, and lower right vertexes of the feed dog hole 95 in this order. The feature points 101, 100, 117, and 116 are disposed to the upper left, upper right, lower left, and lower right vertexes of the feed dog hole 96 in this order. The feature points 124, 126, 125, and 127 are disposed to the upper left, upper right, lower left, and lower right vertexes of the needle plate 80 in this order. The feature points 100 to 127 correspond to feature point numbers "0" through "27", respectively.

Figure 10:
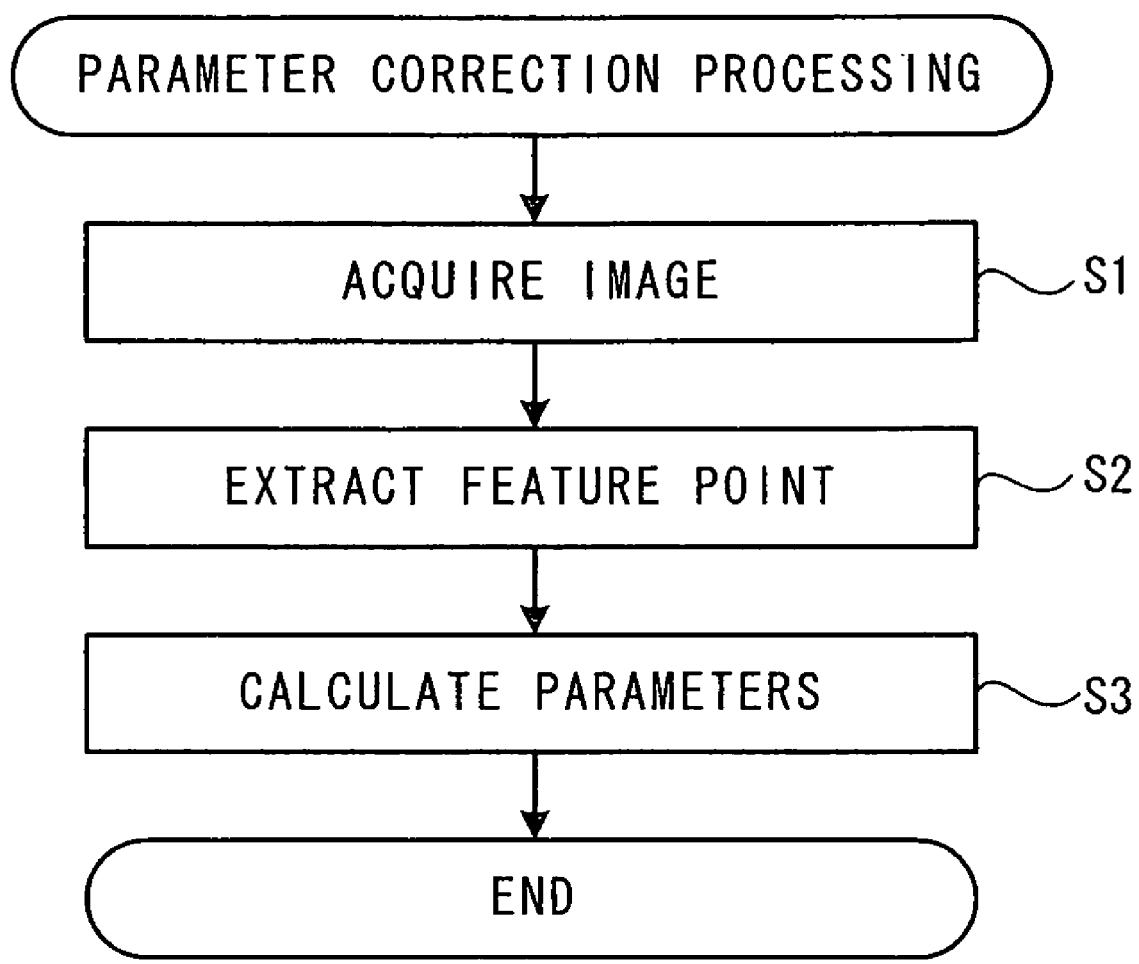
FIG. 10 is a flowchart of parameter calculation processing.

Next, parameter calculation processing will be described below with reference to a flowchart of FIG. 10. The parameter calculation processing will be carried out if the user gives an instruction of "parameter calculation" to permit the CPU 61 to execute a parameter calculation program stored in the ROM 62. An instruction for the execution of parameter calculation may be accepted by the user when the user touches a position on the touch panel 16 corresponding to the position of an instruction button for the performance of parameter calculation that is displayed on the LCD 10. Or a dedicated button may be provided which is used to execute parameter calculation. It should be noted that the user should not place work cloth on the needle plate 80 when he instructs to perform parameter calculation.

In the parameter calculation processing, first an image to be used in parameter calculation is acquired (S1). Specifically, an image of the needle plate 80 is picked up by the image sensor 50 and stored in the picked-up image storage area 631 of the RAM 63. Subsequently, feature points are extracted from this picked-up image and their coordinates are stored in the two-dimensional feature point coordinates storage area 632 of the RAM 63 (S2). Specifically, first a plurality of straight lines is extracted from the picked-up image stored in the picked-up image storage area 631. These straight lines are extracted by, for example, a known Hough transform method. Sobel filtering processing is performed on the picked-up image, to create an edge intensity image (image in which a position having a steep change in image density is highlighted). Next, the edge intensity image is binarized to edge dot sequence image. Next, Hough transform is performed on the intensity image to create a Hough-transformed image. Next, non-maximal suppression processing is performed on the Hough-transformed image to extract dots that are locally bright (in a mask) from the Hough-transformed image. Next, threshold value processing is carried out to extract only those of the extracted bright dots that are brighter than a predetermined threshold value. Next, inverse Hough transform is performed to extract straight lines. It should be noted that if no straight lines can be extracted, the needle plate 80 or the feed dog hole 90 on which the feature points 100 to 127 are disposed may possibly be hidden by foreign matter, so that an alarm message saying, for example, "Do not place anything on the needle plate" will be output to the LCD 10.

Subsequently, the process calculates the coordinates of intersection points between the extracted straight lines. The coordinates of the intersection points that correspond to the feature points out of those intersections whose coordinates have been calculated are stored in the two-dimensional feature point coordinates storage area 632 in a condition where they are correlated with the feature point numbers. It should be noted that the corresponding relation between the calculated coordinates of the intersections and the coordinates of the feature points is determined, for example, by the following manner. Since the feature points 100 to 127 on the needle plate 80 are determined beforehand, the coordinates of the feature points 100 to 127 in an image picked up by the image sensor 50 at a certain stage (for example, before shipment from a sewing machine manufacturer) are stored into the ROM 62 or the EEPROM 64 in a condition where they are correlated with the feature point numbers. Or it is assumed that the coordinates of the feature points 100 to 127 are written as comparison values in a parameter calculation program beforehand. Then, the intersection closest to the coordinates of each of the feature points written in the ROM 62, the EEPROM 64, or the parameter calculation program is defined as the coordinates of a feature point in the picked-up image. By thus correlating two-dimensional coordinates of the feature points calculated from the picked-up image with the feature point numbers, those coordinates can be permitted to correspond to three-dimensional coordinates of the feature points stored in the three-dimensional feature point coordinates storage area 641 in a condition where they are correlated with the feature point numbers. It should be noted that if a total number of the intersections whose coordinates have been calculated is less than a total number of the feature points numbers, the needle plate 80 or the feed dog hole 90 having feature points 100 to 127 may possibly be hidden by foreign matter, so that an alarm message saying, for example, "Do not place anything on the needle plate" will be output to the LCD 10.

Subsequently, the parameters are calculated and stored in the internal comparison parameter storage area 642 and the external comparison parameter storage area 643 of the EEPROM 64 (S3). The parameters are calculated by a known camera calibration parameter calculation method based on a combination of the two-dimensional coordinates of the feature points calculated at S2 (see FIG. 5) and the three-dimensional coordinates of the feature points stored in the three-dimensional feature point coordinates storage area 641 of the EEPROM 64 (see FIG. 7). The parameter calculation method involves picking up a subject containing points (feature points) whose three-dimensional coordinates are known by a camera, calculating two-dimensional coordinates of the feature points in the picked-up image, obtaining a projection matrix based on the known three-dimensional coordinates and the calculated two-dimensional coordinates, and obtaining the parameters from the projection matrix. This calculation method has been studied to propose various calculation methods (see, for example, BACKGROUND of Japanese Patent Application Laid-Open Publication No. 3138080). In the present embodiment, any one of the calculation methods may be used, in any case of which the needle plate 80 will be used as a subject containing points whose three-dimensional coordinates are known.

An internal parameter is used to correct a shift in focal distance, principal point coordinates or strain of a picked-up image which are caused by the properties of the image sensor 50. In the present embodiment, the following six internal parameters will be calculated: X-axial focal distance, Y-axial focal distance, X-axial principal point coordinate, Y-axial principal point coordinate, first coefficient of strain, and second coefficient of strain. It should be noted that in the case of using an image picked up by the image sensor 50, if the center position of the picked-up image is unclear or the pixels of the image sensor 50 are not square-shaped, problems occur that the two coordinate axes of the image may have different scales or may not always be orthogonal to each other. In order to eliminate these problems, the concept of a "normalization camera" will be introduced which picks up images at a position which is a unit length away from its focal point in a condition where the two coordinate axes have the same scale and are orthogonal to each other. Then, the image picked up by the image sensor 50 will be converted into a image picked up by this normalization camera (normalized image). When converting into this normalized image, the internal parameters are used.

The X-axial focal distance is an internal parameter which represents an x-axis directional shift of the focal distance of the image sensor 50, and the Y-axial focal distance is an internal parameter which represents a y-axis directional shift of the focal distance of the image sensor 50. The X-axial principal point coordinate is an internal parameter which represents an x-axis directional shift of the principal point and the Y-axial principal point coordinate is an internal parameter which represents a y-axis directional shift of the principal point of the image sensor 50. The first coefficient of strain and the second coefficient of strain are internal parameters which represent strain due to the inclination of a lens of the image sensor 50.

An external parameter is used to indicate a condition (position and direction) of the image sensor 50 in which it is set up with respect to the world coordinate system. In other words, the external parameter indicates a shift of the three-dimensional coordinate system in the image sensor 50 (hereinafter referred to as a "camera coordinate system") with respect to the world coordinate system. In the present embodiment, the following six external parameters will be calculated: X-axial rotation vector, Y-axial rotation vector, Z-axial rotation vector, X-axial translational vector, Y-axial translational vector, and Z-axial translational vector. With external parameters, the camera coordinate system of the image sensor 50 can be converted into the world coordinate system. The X-axial rotation vector represents a rotation of the camera coordinate system of the image sensor 50 around the x-axis, the Y-axial rotation vector represents a rotation of the camera coordinate system of the image sensor 50 around the y-axis, and the Z-axial rotation vector represents a rotation of the camera coordinate system of the image sensor 50 around the z-axis with respect to the world coordinate system. The X-axial rotation vector, the Y-axial rotation vector, and the Z-axial rotation vector are used to determine a conversion matrix which is to be converted from the world coordinate system into the camera coordinate system or vice versa. The X-axial translational vector represents an x-axial shift of the camera coordinate system, the Y-axial translational vector represents a y-axial shift of the camera coordinate system, and Z-axial translational vector represents a z-axial shift of the camera coordinate system with respect to the world coordinate system. The X-axial translational vector, the Y-axial translational vector, and the Z-axial translational vector are used to determine a translational vector which is to be converted from the world coordinate system into the camera coordinate system or vice versa.

For example, from the combination of the two-dimensional coordinates and three-dimensional coordinates of the feature points of the examples shown in FIGS. 5 and 7, respectively, the following parameters are calculated. As for the internal parameters, the X-axial focal distance=724.99418, the Y-axial focal distance=725.18331, the X-axial principal point coordinate=326.51234, the Y-axial principal point coordinate=246.694, the first coefficient of strain=0.2063882, and the second coefficient of strain=−0.6730771. As for the external parameters, the X-axial rotation vector=2.8974873, the Y-axial rotation vector=0.0234429, the Z-axial rotation vector=0.0165490, the X-axial translational vector=−1.5031760, the Y-axial translational vector=−2.3138816, and the Z-axial translational vector=102.9899989.

In such a manner, it is possible to extract two-dimensional coordinates in the camera coordinate system of the feature points 100 to 127 on the needle plate 80 with an image of this needle plate 80 picked up by the image sensor 50, correlate those coordinates with three-dimensional coordinates in the world coordinate system of the feature points 100 to 127 stored in the three-dimensional feature point coordinates storage area 641 of the EEPROM 64, and calculate at least one of an internal parameter and an external parameter by the sewing machine 1 itself. The parameters can thus be calculated using the member of the needle plate 80, which is originally equipped to the sewing machine 1. Therefore, the sewing machine 1 is capable of calculating the parameter easily without using any particular member.

Next, an example of using parameters will be described below. The parameters are used when converting three-dimensional coordinates of a point in the world coordinate system into two-dimensional coordinates of the point in a picked-up image plane in the camera coordinate system, converting two-dimensional coordinates of a point in the picked-up image plane in the camera coordinate system into three-dimensional coordinates of a point in the world coordinate system, or processing an image picked up by the image sensor 50.

It is here assumed that point p in a picked-up image has two-dimensional coordinates (u, v) as well as three-dimensional coordinates $M_1$ ($X_1, Y_1, Z_1$) in the camera coordinate system. It is also assumed that point P obtained by converting point p into the world coordinate system has three-dimensional coordinates $M_w(X_w, Y_w, Z_w)$. As for the internal parameters, assume that the X-axial focal distance is fx, the Y-axial focal distance is fy, the X-axial principal point coordinate is cx, the Y-axial principal point coordinate is cy, the first coefficient of strain is $k_1$, and the second coefficient of strain is $k_2$. As for the external parameters, assume that the X-axial rotation vector is $r_1$, the Y-axial rotation vector is $r_2$, the Z-axial rotation vector is $r_3$, the X-axial translational vector is $t_1$, the Y-axial translational vector is $t_2$, and the Z-axial translational vector is $t_3$. Assume also that "$R_w$" is 3×3 rotation matrix which is determined based on the external parameters (X-axial rotation vector $r_1$, Y-axial rotation vector $r_2$, and Z-axial rotation vector $r_3$) and "$t_w$" is 3×1 translational vector which is determined based on the external parameters (X-axial translational vector $t_1$, Y-axial translational vector $t_2$, and Z-axial translational vector $t_3$).

First, processing will be described below which calculates the coordinates (u, v) of a point on a picked-up image plane in the camera coordinate system which the coordinates $M_w(X_w, Y_w, Z_w)$ of a point in the world coordinate system is projected onto. First, the coordinates $M_w(X_w, Y_w, Z_w)$ of a point in the world coordinate system are converted into the three-dimensional coordinates $M_1(X_1, Y_1, Z_1)$ of a point in the camera coordinate system. They are calculated by "$M_1 = R_w \times M_w + t_w$". Subsequently, the calculated three-dimensional coordinates of the point in the camera coordinate system are converted into coordinates (x', y') in a normalized image in the camera coordinate system. These coordinates are calculated by "$x'=X_1/Z_1$" and "$y'=Y_1/Z_1$". Further, the first coefficient of strain $k_1$ and the second coefficient of strain $k_2$, which are internal parameters, are used to calculate coordinates (x", y") obtained by adding strain of the lens of the image sensor 50 to a normalization camera. These are calculated by "$x''=x' \times (1+k_1 \times r^2 + k_2 \times r^4)$" and "$y''=y' \times (1+k_1 \times r^2 + k_2 \times r^4)$". It should be noted that "$r^2 = x'^2 + y'^2$". Subsequently, the X-axial focal distance fx, the Y-axial focal distance fy, the X-axial principal point coordinate cx, and the Y-axial principal point coordinate cy, which are internal parameters, are added to the coordinates (x", y") obtained by adding the strain of the lens to the point in the normalized image to convert them into coordinates (u, v) in the picked-up image in the camera coordinate system. These coordinates are calculated by "$u = fx \times x'' + cx$" and "$v = fy \times y'' + cy$".

Next, processing will be described below which calculates the three-dimensional coordinates $M_w(X_w, Y_w, Z_w)$ of point P in the world coordinate system into which point p in an image picked up by the image sensor 50 is converted, from the coordinates (u, v) of this point p. By adding the X-axial focal distance fx, the Y-axial focal distance fy, the X-axial principal point coordinate cx, and the Y-axial principal point coordinate cy, which are internal parameters, the coordinates (u, v) of the point in the picked-up image in the camera coordinate system are converted into coordinates (x", y") in the normalized image in the camera coordinate system. These coordinates are calculated by "$x''=(u-cx)/fx$" and "$y''=(v-cy)/fy$". Subsequently, with the first coefficient of strain $k_1$ and the second coefficient of strain $k_2$, which are internal parameters, the strain of the lens is removed from the coordinates (x", y") to convert them into coordinates (x', y') in the normalized image. These coordinates are calculated by "$x'=x'' \times x'' \times (1+k_1 \times r^2 + k_2 \times r^4)$" and "$y'=y''-y'' \times (1+k_1 \times r^2 + k_2 \times r^4)$". Then, the coordinates in the normalized image in the camera coordinate system are converted into the three-dimensional coordinates $M_1(X_1, Y_1, Z_1)$ of the point in the camera coordinate system. It should be noted that $X_1$ and $Y_1$ have relationships of "$X_1 = x' \times Z_1$" and "$Y_1 = y' \times Z_1$", respectively. Also, the relationship of "$M_w = R_w^T (M_1 - t_w)$" is established between the three-dimensional coordinates $M_1(X_1, Y_1, Z_1)$ in the camera coordinate system and the three-dimensional coordinates $M_w(X_w, Y_w, Z_w)$ in the world coordinate system. It should be noted that $R_w^T$ is a transposed matrix of $R_w$. In this case, since the XY plane in the world coordinate system is set on the upper surface of the sewing machine bed 2, the simultaneous equations of "$X_1=x'\times Z_1$", "$Y_1=y'\times Z_1$", and "$M_w=R_w^T(M_1-t_w)$" are solved on the assumption that $Z_w=0$. In such a manner, $Z_1$ is calculated, $X_1$ and $Y_1$ are calculated, and $M_w(X_w, Y_w, Z_w)$ are calculated.

Next, processing will be described below which processes an image picked up by the image sensor 50. Here, processing will be described which process a picked-up image into an image (viewpoint-changed image) picked up from a different viewpoint (different camera position). The image sensor 50 is mounted to a position where it picks up an image of the needle plate 80 from above (see FIG. 2). In other words, its viewpoint is higher in height than the needle plate 80 (in the positive direction on the Z-axis). This viewpoint is changed, for example, to a diagonally upper right position of the needle plate 80, to process the picked-up image into a viewpoint-changed image obtained by imaging the needle plate 80 from this diagonally upper right position.

It is here assumed that the three-dimensional coordinates of a point in the world coordinate system are $M_w(X_w, Y_w, Z_w)$, the three-dimensional coordinates of a point in the camera coordinate system of the image sensor 50 are $M_1(X_1, Y_1, Z_1)$, and the three-dimensional coordinates of a point in a coordinate system (moved-viewpoint coordinate system) of the moved viewpoint are $M_2(X_2, Y_2, Z_2)$. It is also assumed that the two-dimensional coordinates of a point in a picked-up image plane in the camera coordinate system are $(u_1, v_1)$ and the two-dimensional coordinates of a point in a viewpoint-changed image plane in the moved-viewpoint coordinate system is $(u_2, v_2)$. "$R_w$" is 3×3 rotation matrix which is determined based on the X-axial rotation vector $r_1$, the Y-axial rotation vector $r_2$, and the Z-axial rotation vector $r_3$, which are external parameters and "$t_w$" is 3×1 translational vector which is determined based on the X-axial translational vector $t_1$, the Y-axial translational vector $t_2$, and the Z-axial translational vector $t_3$ which are an external parameter. In other words, $R_w$ and $t_w$ are utilized when converting the three-dimensional coordinates $M_w(X_w, Y_w, Z_w)$ in the world coordinate system into the three-dimensional coordinates $M_1(X_1, Y_1, Z_1)$ in the camera coordinate system. When converting the three-dimensional coordinates $M_w(X_w, Y_w, Z_w)$ in the world coordinate system into the three-dimensional coordinates $M_2(X_2, Y_2, Z_2)$ in the moved-viewpoint coordinate system, $R_{21}$ (3×3 rotation matrix) and $t_{w2}$ (3×1 translational vector) are utilized. These determinants are determined based on which point in the world coordinate system the viewpoint of a destination corresponds to. A determinant that converts the three-dimensional coordinates $M_2(X_2, Y_2, Z_2)$ in the moved-viewpoint coordinate system into the three-dimensional coordinates $M_1(X_1, Y_1, Z_1)$ in the camera coordinate system are assumed to be $R_{21}$ (3×3 rotation matrix), $t_{21}$ (3×1 translational vector).

First, the determinant $R_{21}, t_{21}$ is calculated which converts the three-dimensional coordinates $M_2(X_2, Y_2, Z_2)$ in the moved-viewpoint coordinate system into the three-dimensional coordinates $M_1(X_1, Y_1, Z_1)$ in the camera coordinate system. The following relationships are established among $R_w, R_{w2}, R_{21}, t_w, t_{w2}$, and $t_{21}$: "$M_1=R_w\times M_w+t_w$ (conversion from the world coordinate system into the camera coordinate system)"; "$M_2=R_{w2}\times M_w+t_{w2}$ (conversion from the world coordinate system into the moved-viewpoint coordinate system)"; and "$M_1=R_{21}\times M_2+t_{21}$ (conversion from the moved-viewpoint coordinate system into the camera coordinate system)". Solving these in terms of $R_{21}$ and $t_2$ results in "$R_{21}=R_w\times R_{w2}^T$" and "$t_{21}=-R_w\times R_{w2}^T\times t_w$". Since $R_w, R_{w2}, t_w$, and $t_{w2}$ are fixed values that have already been calculated, $R_{21}$ and $t_{21}$ are determined uniquely.

Next, the process calculates two-dimensional coordinate $(u_1, v_1)$ which the two-dimensional coordinate $(u_2, v_2)$ of a point in the viewpoint-changed image correspond to. For this purpose, the two-dimensional coordinate $(u_2, v_2)$ of the point in the viewpoint-changed image is converted into two-dimensional coordinate $(x_2", y_2")$ in a normalized image in the moved-viewpoint coordinate system. It should be noted that "$x_2"=(u_2-cx)/fx$" and "$y_2"=(v_2-cy)/fy$". In this case, the X-axial focal distance fx, the Y-axial focal distance fy, the X-axial principal point coordinate cx, and the Y-axial principal point coordinate cy, which are internal parameters, are used. Subsequently, coordinates $(x_2', y_2')$ are calculated which are obtained by adding the strain of the lens to the two-dimensional coordinates $(x_2", y_2")$ in the normalized image. In this case, "$x_2'=x_2"-x_2"\times(1+k_1\times r^2+k_2\times r^4)$" and "$y_2'=y_2"-y_2"\times(1+k_1\times r^2+k_2\times r^4)$". It should be noted that "$r^2=x_2'^2+y_2'^2$". In this case, the first coefficient of strain $k_1$ and the second coefficient of strain $k_2$, which are internal parameters, are used.

Subsequently, three-dimensional coordinates $M_2(X_2, Y_2, Z_2)$ in the moved-viewpoint coordinate system are calculated from the two-dimensional coordinates $(x_2', y_2')$ in the normalized image in the moved-viewpoint coordinate system. In this case, "$X_2=x_2'\times Z_2$" and "$Y_2=y_2'\times Z_2$". Further, since the upper surface of the sewing machine bed 2 is set as the XY plane in the world coordinate system, $Z_w=0$ is set in "$M_2=R_{w2}\times M_w+t_{w2}$". Then, by solving the simultaneous equations, the three-dimensional coordinates $M_2(X_2, Y_2, Z_2)$ in the moved-viewpoint coordinate system are calculated.

Then, the three-dimensional coordinates $M_2(X_2, Y_2, Z_2)$ in the moved-viewpoint coordinate system are converted into three-dimensional coordinates $M_1(X_1, Y_1, Z_1)$ in the camera coordinate system. In this case, $M_2(X_2, Y_2, Z_2)$ are substituted into the equation of "$M_1=R_{21}\times M_2+t_{21}$", to calculate $M_1(X_1, Y_1, Z_1)$. Subsequently, the three-dimensional coordinates $M_1(X_1, Y_1, Z_1)$ in the camera coordinate system are converted into two-dimensional coordinates $(x_1', y_1')$ in the normalized image in the camera coordinate system. In this case, "$x_1'=x_1/z_1$" and "$y_1'=y_1/z_1$". Further, two-dimensional coordinates $(x_1", y_1")$ are calculated to which the strain of the lens is added. In this case, "$x_1"=x_1'\times(1+k_1\times r^2+k_2\times r^4)$" and "$y_1"=y_1'\times(1+k_1\times r^2+k_2\times r^4)$" are used in this calculation. It should be noted that "$r^2=x_1'^2+y_1'^2$". Subsequently, the two-dimensional coordinates $(x_1", y_1")$ in the normalized image are converted into two-dimensional coordinates $(u_1, v_1)$ in the image coordinates. These coordinates are calculated by "$u_1=fx\times x_1"+cx$" and "$v_1=fy\times y_1+cy$".

By performing such processing on all of the pixels of a viewpoint-changed image, the corresponding relationship between the pixel $(u_1, v_1)$ of a picked-up image and the pixel $(u_2, v_2)$ of a viewpoint-changed image is known, so that the viewpoint-changed image can be created from the picked-up image.

In such a manner, with parameters calculated in the sewing machine 1, the three-dimensional coordinates of a point in the world coordinate system can be converted into the two-dimensional coordinates of a point in the picked-up image plane in the camera coordinate system. It is thus possible to acquire the coordinates in the two-dimensional coordinate system of a point represented in the three-dimensional coordinates by taking into account the peculiar properties and setup conditions of the image sensor 50.

Further, with parameters calculated in the sewing machine 1, the three-dimensional coordinates of a point in the picked-up image plane in the camera coordinate system can be converted into the three-dimensional coordinates of a point in the world coordinate system. It is thus possible to grasp a point in a picked-up image as a real point in the three-dimensional coordinate system in a condition which the effects of the peculiar properties and setup conditions of the image sensor 50 are eliminated from, thereby grasping the positional relationship of a real point in the three-dimensional coordinate system and acquiring a distance between two points.

Further, with parameters calculated in the sewing machine 1, it is possible, for example, to process an image picked up by the image sensor 50. It is thus possible to obtain an image in which real points in the three-dimensional coordinate system are accurately projected onto the two-dimensional coordinates in a condition which the effects of the peculiar properties and setup conditions of the image sensor 50 are eliminated from.

It should be noted that the sewing machine 1 according to the present embodiment has employed a small-sized and inexpensive CMOS sensor as the image pickup device, thereby making it possible to downsize a space in which the image pickup device is set up in the sewing machine and to reduce the costs of the photographing device.

Further, in the sewing machine 1 according to the present embodiment, feature points have been set to holes or punch marks formed in the needle plate 80 that is originally equipped to the sewing machine 1, thus enabling calculating parameters therefrom. Therefore, any other feature points need not be set to calculate the parameter, so that the user as well as the manufacturer of the sewing machine 1 can easily calculate the parameters and detect a shift in location where the image sensor 50 is set up. Thus, even when the user is using the sewing machine 1, it is possible to acquire accurate position information from an image picked up by the image sensor 50, thereby properly carrying out processing that uses the position information acquired from the image.

Further, the sewing machine 1 can pick up an image over the sewing machine bed 2 by the image sensor 50 equipped to the sewing machine 1, extract feature points, and correlate them with and compare them with feature point coordinates stored beforehand, to calculate parameters, thereby calculating those parameters by itself without requiring any other apparatuses for that purpose.

Figure 11:
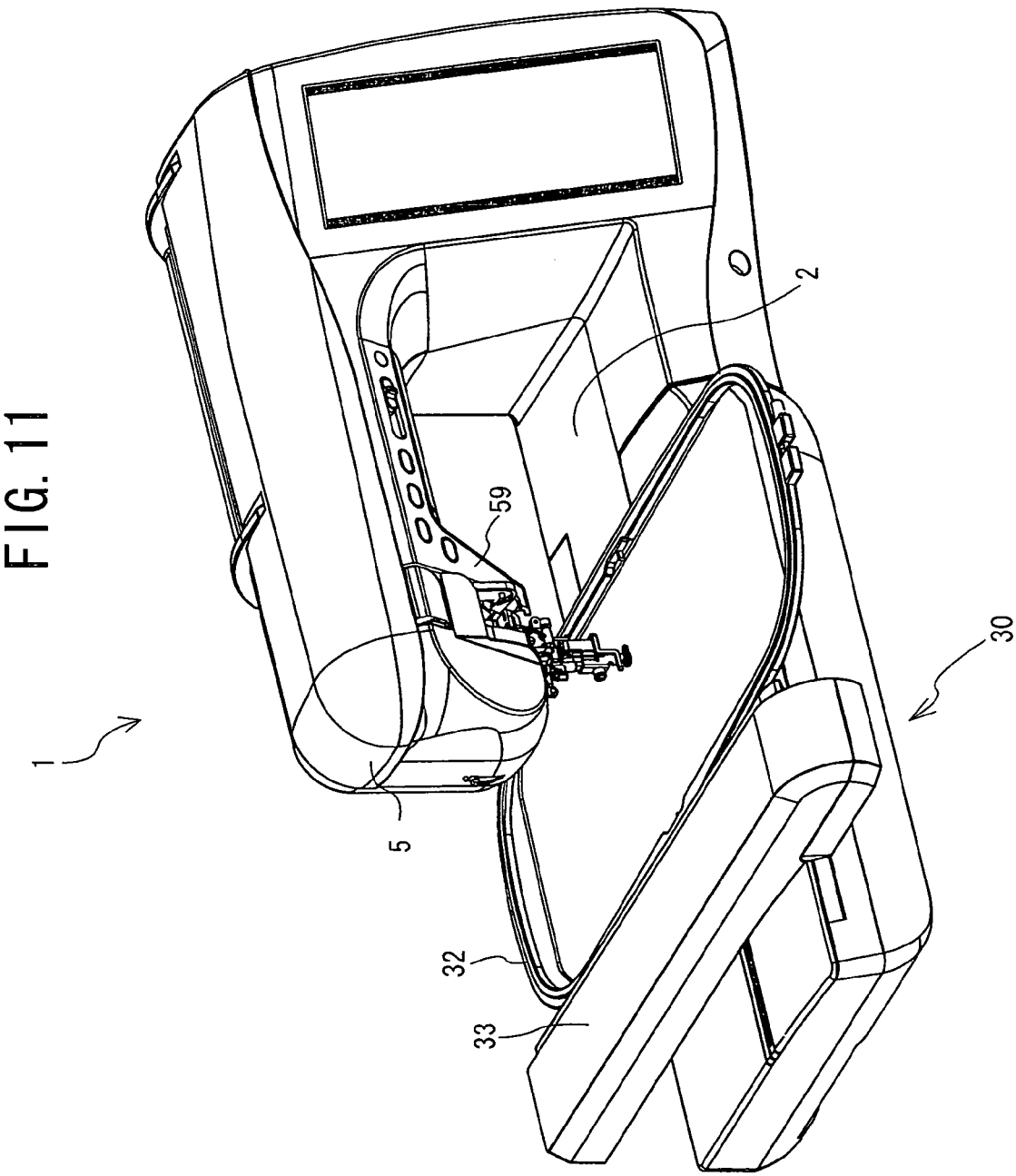
FIG. 11 is a perspective view of the sewing machine equipped with an embroidery apparatus as viewed from the top.

The sewing machine according to the present disclosure is not limited to the above embodiment and of course can be changed variously without departing from the gist of the present disclosure. Although the above embodiment has set the feature points 100 to 127 on the needle plate 80 to calculate parameters, the positions and the number of the feature points are not limited to them. Although the above embodiment has set only an intersection between straight lines as a feature point, it may be possible to calculate coordinates of the center of a circle by Hough transform and set a feature point to that center of the circle. The circles may be, for example, the holes 81 to 85. Further, even in the case of using the intersection between straight lines, the holes are not limited in shape to a rectangle but may be a vertex of a pentagon or a hexagon. Further, the feature points need not be set on the needle plate 80. For example, the feature points may be set on an embroidery frame 32 of a sewing machine as far as the sewing machine can be equipped with the embroidery apparatus 30 as shown in FIG. 11.

A case where feature points are set on the embroidery frame 32 will be described below with reference to FIGS. 11 to 14. First, the embroidery apparatus 30 will be described. As shown in FIG. 11, the embroidery apparatus 30 is mounted after the side table 8 is detached from the sewing machine bed 2 of the sewing machine 1. In this condition, the embroidery apparatus 30 is electrically connected to the sewing machine 1. The embroidery apparatus 30 is mounted thereon with a carriage cover 33 which extends in the front-and-rear direction. Inside the carriage cover 33, a front-and-rear movement mechanism (not shown) is fitted which moves in the front-and-rear direction a carriage (not shown) to which the embroidery frame 32 is attached detachably. To the right of the carriage, a mounting portion (not shown) is fitted to mount the embroidery frame 32. This mounting portion is disposed in such a manner as to project rightward from the right side surface of the carriage cover 33. To this mounting portion, a guide (which corresponds to a guide 251 in FIG. 12) is mounted on the left side of the embroidery frame 32. The carriage, the front-and-rear movement mechanism, and the carriage cover 33 are driven by a right-and-left movement mechanism (not shown) equipped within the body of the embroidery apparatus 30 in such a manner that they may move in the right-and-left direction. By this configuration, the embroidery frame 32 is driven so as to move in the right-and-left direction. These front-and-rear movement mechanism and right-and-left movement mechanism are driven by a Y-axis motor (not shown) and an X-axis motor (not shown), respectively. By outputting a drive instruction to the Y-axis and X-axis motors from the CPU 61 in the sewing machine 1, the embroidery frame 32 can be moved in the front-and-rear and right-and-left directions. It should be noted that the size of the embroidery frame 32 is not limited to that shown in FIG. 11 but may be various ones such as that of an embroidery frame 250 shown in FIG. 12, which is smaller than the embroidery frame 32.

Figure 12:
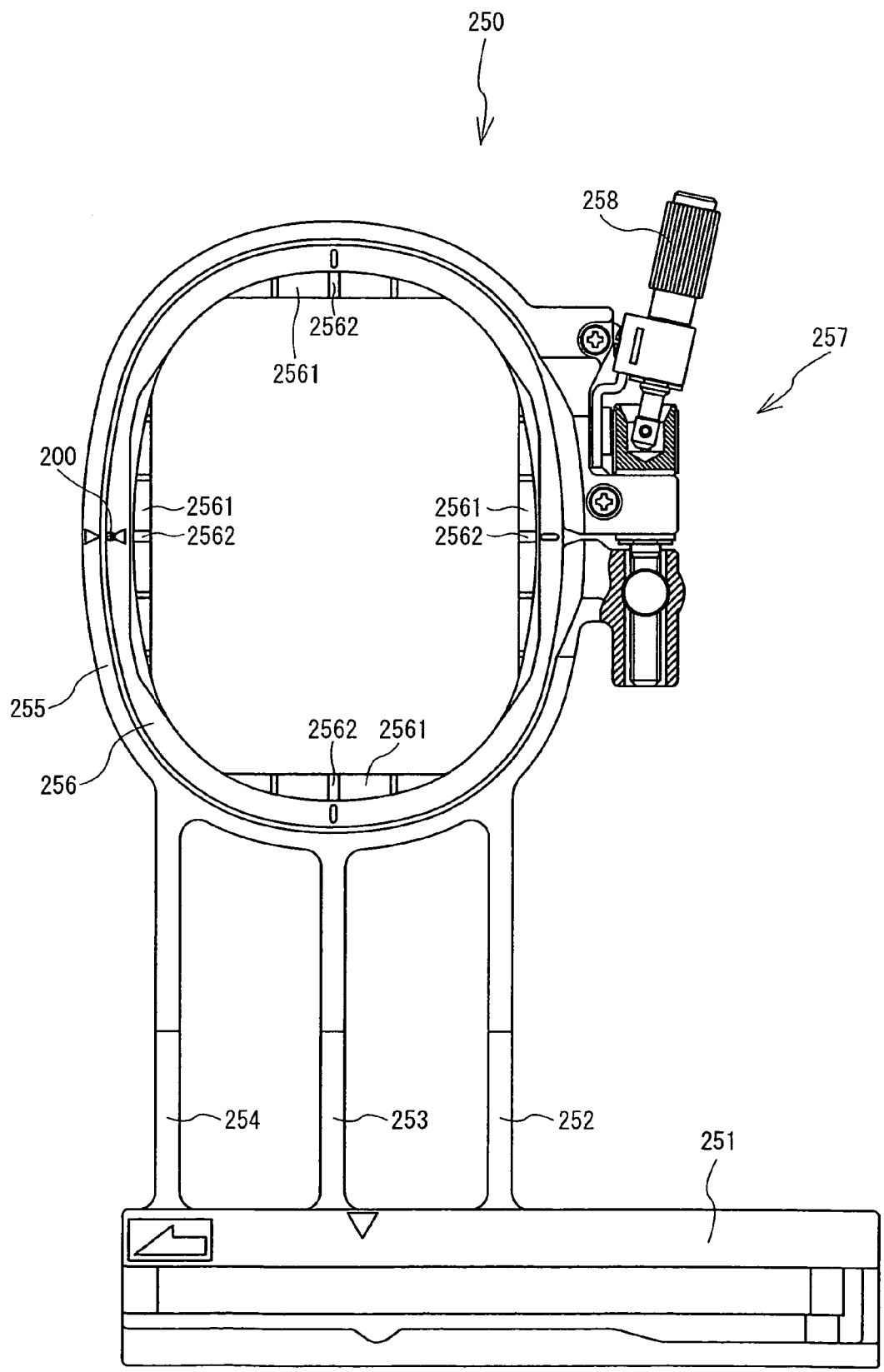
FIG. 12 is a plan view of an embroidery frame smaller than that shown in FIG. 11.
Figure 13:
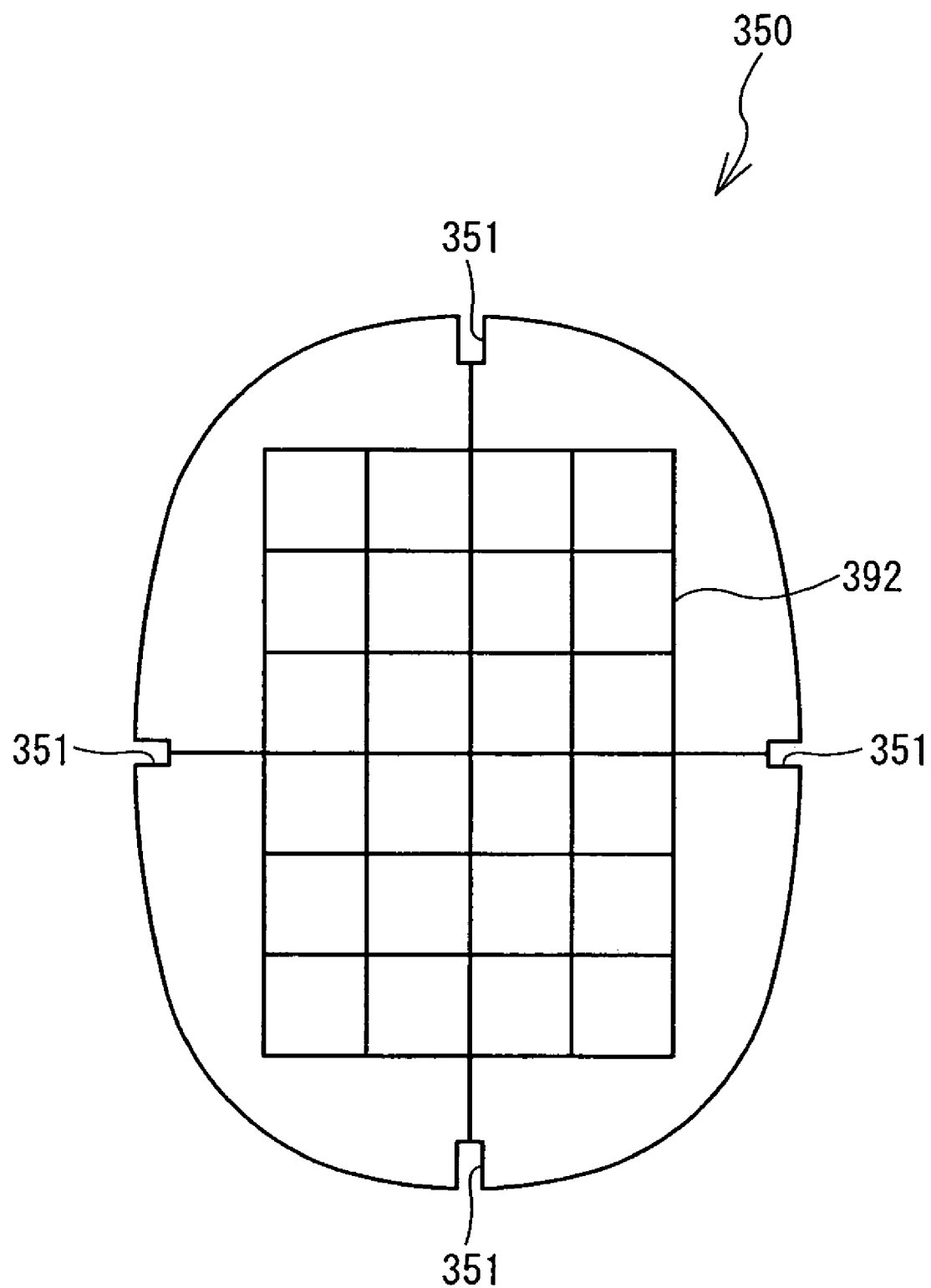
FIG. 13 is a plan view of a template placed on the embroidery frame.

Now, the embroidery frame 250 will be described below with reference to FIG. 12. The embroidery frame 250 is mainly constituted of a guide 251, support bars 252 to 254, an outer frame 255, an inner frame 256, and an adjustment mechanism 257. From the guide 251 which is substantially rectangular in plane view, the support bars 252 to 254 which support the outer frame 255 which is roughly elliptical in plane view is extended. At the substantially middle position of the lower surface of the guide 251, a projection portion (not shown) is provided which extends in the longitudinal direction. By engaging this projection portion into an engagement groove (not shown) which is formed in the carriage of the embroidery apparatus 30 in such a manner as to extend in the front-and-rear direction, the embroidery frame 250 is mounted to the carriage. In a condition where that frame is mounted, the projection portion is urged by an elastic urging spring (not shown) fitted to the carriage in such a direction as to be pressed toward the engagement groove, so that the embroidery frame 250 is securely engaged with the carriage without rattling movements so that the embroidery frame 250 and the carriage may move integrally. Inside the outer frame 255, the inner frame 256 is fitted whose outer peripheral shape is substantially the same as the inner peripheral shape of the outer frame 255. Work cloth is sandwiched between the outer frame 255 and the inner frame 256 and then held on the embroidery frame 250 when the adjustment screw 258 of the adjustment mechanism 257 on the outer frame 255 is tightened. At four positions on the lower end portion of the inner periphery of the inner frame 256, a reinforcement rib 2561 is provided. The height of the reinforcement rib 2561 is about one fourth of that of the inner frame 256. On the reinforcement ribs 2561, a template 350 (see FIG. 13) is placed which is formed slightly smaller than the inner peripheral shape of the inner frame 256. At the substantially middle position of the reinforcement ribs 2561, an engaging projection portion 2562 is provided which is engaged with a notched portion 351 for positioning of the template 350. When the engaging projection portion 2562 is engaged with the notched portion 351, a position on the inner frame 256 will be determined at which the template 350 is to be placed. The template 350 is a sheet made of a transparent resin, on the surface of which a plurality of base lines 392 are printed in a grid as shown in FIG. 13. When sandwiching work cloth between the outer frame 255 and the inner frame 256, the user will attach the work cloth to the embroidery frame 250 as aligning a specific portion of the baseline 392 with a mark provided on the work cloth with a chalk pencil etc. (not shown) beforehand. It is thus possible prepare for sewing a desired embroidery pattern at a desired position on the work cloth.

Figure 14:
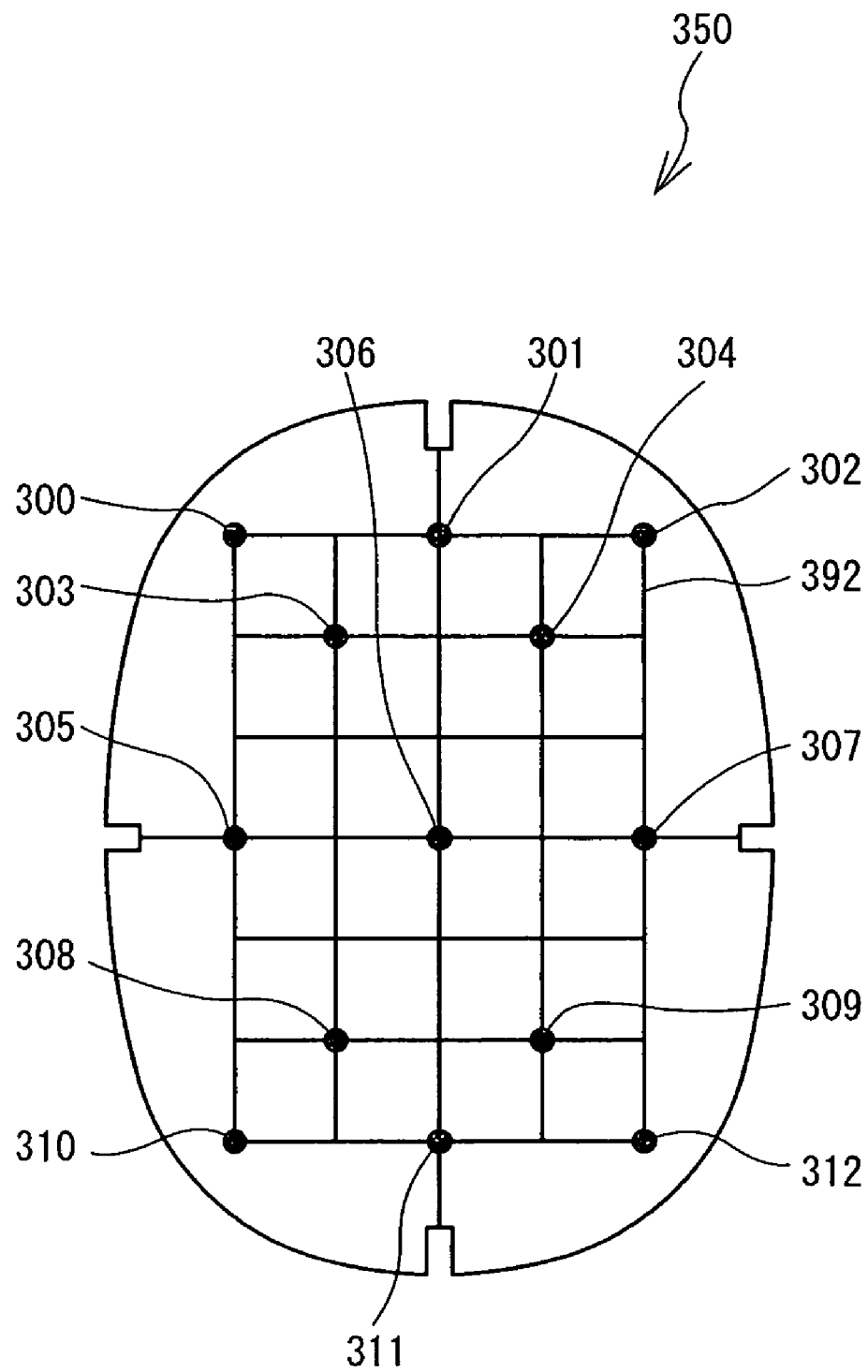
FIG. 14 is a plan view of the template shown in FIG. 13.

Now, one example will be described below regarding feature points using an embroidery frame. As shown in FIG. 14, feature points 300 to 312 are disposed on the template 350. Then, three-dimensional coordinates of the feature points 300 to 312 at the time when the embroidery frame 250 has been moved to a predetermined position are stored in the three-dimensional feature point coordinates storage area 641 in the EEPROM 64 beforehand. Further, instructions (of movement distances) which are issued to the X-axis and Y-axis motors to move the embroidery frame 250 to the predetermined position are also stored in the EEPROM 64 already. Then, according to the parameter calculation program, when an image is being acquired at S1, the embroidery frame 250 is moved to the predetermined position so that the image is picked up by the image sensor 50. The following steps of feature point extraction (S2) and parameter calculation (S3) are the same as those of the above embodiment. It should be noted that the feature points may be disposed on the embroidery frame 250 instead of the template 350.

Next, a modification will be described below regarding feature points using an embroidery frame. One feature point is disposed on the embroidery frame 250. In an example shown in FIG. 12, a feature point 200 is disposed at the vertex of one of triangular marks provided on the upper surface of the inner frame 256. The triangular mark is used as a standard for aligning with the outer frame 255. If straight lines are extracted from a picked-up image containing the triangular mark, the sides of the triangular mark are extracted as straight lines, thus enabling calculation of coordinates of the vertex of the triangle formed by an intersection between the straight lines. Then, three-dimensional coordinates of the feature point 200 at the time when the embroidery frame 250 has been moved to a plurality of predetermined positions are stored in the three-dimensional feature point coordinates storage area 641 in the EEPROM 64 beforehand. As Shown in FIG. 15, instructions (of movement distances) which are issued to the X-axis and Y-axis motors to move the embroidery frame 250 to the predetermined positions are also correlated with three-dimensional coordinates and stored already in the EEPROM 64 in the case of this modification. In other words, even with the only one feature point 200 disposed, the position of the feature point 200 is moved by moving the embroidery frame 250. Therefore, if there are 10 destinations of the embroidery frame 250, the feature point 200 also has 10 positions, which will be the same as 10 feature points being disposed.

Then, according to the parameter calculation program, an image of the embroidery frame 250 moved to the first predetermined position is picked up by the image sensor 50 (S1), where image the feature point 200 is extracted (S2). Next, an image of the embroidery frame 250 moved to the second predetermined position is picked up by the image sensor 50 (S1), where image the feature point 200 is extracted (S2).

Then processings of S1 and S2 will be repeated until two-dimensional coordinates of the feature point 200 at all of the predetermined positions are calculated. After that, parameters are calculated based on the two-dimensional coordinates of the feature point 200 at all of the predetermined positions and the three-dimensional coordinates stored in the three-dimensional feature point coordinates storage area 641.

It should be noted that in the case of thus obtaining feature points by moving the embroidery frame 250, the number of the feature points to be provided on the embroidery frame is not limited to one. For example, when obtaining 30 feature points finally, the embroidery frame 250 on which three feature points are provided may be moved to 10 positions to acquire its image at each of those positions, thereby extracting a total of 30 feature points.

In the above sewing machine 1, the parameters can be calculated by the embroidery frame 250 or the template 350 which is originally equipped to this sewing machine, so that any other feature points need not be set to calculate the parameters. Therefore, the user as well as the manufacturer of the sewing machine 1 can easily calculate the parameters and detect a shift in location where the image sensor 50 is set up. Thus, even when the user is using the sewing machine 1, it is possible to acquire accurate position information from an image picked up by the image sensor 50, thereby properly carrying out processing that uses the position information acquired from the image.

Further, a feature point may be a point on the embroidery frame 250 or the template 350 in a condition where the embroidery frame 250 is moved and disposed at a predetermined position. Therefore, for example, even in a case where there is one point on the embroidery frame 250 or the template 350, if there are five predetermined positions, it can be assumed that there are five feature points.

Although the above embodiment has calculated both of the internal and external parameters, only the internal parameters calculated by the sewing machine manufacturer may be stored in the ROM 62 or the EEPROM 64 before the shipment of the sewing machine 1 so that only the external parameters might be calculated with the sewing machine 1.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A sewing machine comprising:
   an image pickup device that is disposed at a position where an image can be picked up over a sewing machine bed;
   a feature point coordinates calculation device that extracts a plurality of feature points arranged over a range such that the image pickup device can pick up images therein from the image picked up by the image pickup device and that calculates two-dimensional coordinates of the extracted feature points;
   a reference coordinates storage device that stores reference coordinates, which are previously measured three-dimensional coordinates of the feature points;
   a correlation device that correlates the reference coordinates stored in the reference coordinates storage device with the feature point coordinates, which are the two-dimensional coordinates of the feature points calculated by the feature point coordinates calculation device; and a parameter calculation device that calculates a parameter about the image pickup device based on a result of correlation by the correlation device.

2. The sewing machine according to claim 1, wherein:
the feature point is at least one vertex of a square shaped hole and a center of a circular hole formed in a needle plate placed on the sewing machine bed.

3. The sewing machine according to claim 1, wherein the feature point is a point provided on a surface of the needle plate.

4. The sewing machine according to claim 1, further comprising:
an embroidery apparatus that moves an embroidery frame that holds a work cloth in a condition where the embroidery frame is placed on the sewing machine bed,
wherein the feature point is at least one of:
the point provided on the embroidery frame; and
the point provided on a template placed on the embroidery frame.

5. The sewing machine according to claim 1, further comprising:
an embroidery apparatus that moves an embroidery frame that holds a work cloth in a condition where the embroidery frame is placed on the sewing machine bed, wherein:
at least one point is provided at least on the embroidery frame and on a template placed on the embroidery frame;
the reference coordinates storage device defines the point, as the feature point, in a condition where the embroidery frame is moved by the embroidery apparatus and disposed at a plurality of predetermined positions on the sewing machine bed and then stores the respective reference coordinates of the feature point at the predetermined positions; and
the feature point coordinates calculation device moves the embroidery frame to the plurality of predetermined positions by the embroidery apparatus, picks up an image over the sewing machine bed by the image pickup device, extracts the feature point, and calculates the two-dimensional coordinates of the feature point.

6. The sewing machine according to claim 1, further comprising:
an image processing device that processes an image picked up by the image pickup device, in accordance with the parameter calculated by the parameter calculation device.

7. The sewing machine according to claim 1, further comprising:
a three-dimensional coordinates calculation device that calculates the three-dimensional coordinates of a point in an image picked up by the image pickup device, in accordance with the parameter calculated by the parameter calculation device.

8. The sewing machine according to claim 1, further comprising:
a two-dimensional coordinates calculation device that calculates the coordinates of a point in the two-dimensional coordinate system, which the coordinates of a predetermined point represented in three-dimensional coordinates are projected onto, in accordance with the parameter calculated by the parameter calculation device.

9. The sewing machine according to claim 1, wherein the image pickup device is a CMOS image sensor.

10. A non-transitory computer-readable storage medium storing a control program executable on a sewing machine, the program comprising:
picking up an image over a predetermined range over a sewing machine bed;
extracting a plurality of feature points arranged in the predetermined range from the image picked up and calculating two-dimensional coordinates of the extracted feature points;
storing reference coordinates, which are previously measured three-dimensional coordinates of the feature points;
correlating the reference coordinates stored with the feature point coordinates, which are the two-dimensional coordinates of the feature points calculated; and
calculating a parameter about the image pickup based on a result of correlation.

11. The storage medium according to claim 10, wherein:
the feature point is set to at least one point that is placed on at least one of the embroidery frame of the sewing machine in a condition where the embroidery frame is disposed at a predetermined position on the sewing machine bed and a template placed on the embroidery frame;
storing reference coordinates, the reference coordinates of the feature point are stored at each of a plurality of predetermined positions on the sewing machine bed disposed by permitting the embroidery frame to move; and
extracting a plurality of feature points, the embroidery frame is moved to the plurality of predetermined positions, an image is picked up over the sewing machine bed, the feature point is extracted, and the two-dimensional coordinates of the feature point are calculated.

12. The storage medium according to claim 10, further comprising:
processing an image picked up, in accordance with the parameter calculated.

13. The storage medium according to claim 10, further comprising:
calculating the three-dimensional coordinates of a point in an image picked up, in accordance with the parameter calculated.

14. The storage medium according to claim 10, further comprising:
calculating the coordinates of a point in the two-dimensional coordinate system, in which the coordinates of a predetermined point represented in the three-dimensional coordinates are projected onto, in accordance with the parameter calculated.

* * * * *